United States Patent
Bennett et al.

(10) Patent No.: US 11,077,775 B2
(45) Date of Patent: Aug. 3, 2021

(54) MULTI-POSITION ANTI-REBOUND BAR

(71) Applicant: BRITAX CHILD SAFETY, INC., Fort Mill, SC (US)

(72) Inventors: Joel Hyrum Bennett, Clover, SC (US); Brandon Cory Hoover, Cornelius, NC (US); Adam Mark Will, Indian Land, SC (US); Ningsheng Zhang, Waxhaw, NC (US)

(73) Assignee: BRITAX CHILD SAFETY, INC., Fort Mill, SC (US)

( * ) Notice: Subject to any disclaimer, the term of this patent is extended or adjusted under 35 U.S.C. 154(b) by 0 days.

(21) Appl. No.: 16/184,304

(22) Filed: Nov. 8, 2018

(65) Prior Publication Data
US 2019/0135141 A1    May 9, 2019

Related U.S. Application Data

(60) Provisional application No. 62/582,971, filed on Nov. 8, 2017.

(51) Int. Cl.
*B60N 2/28*   (2006.01)
*B60N 3/06*   (2006.01)

(52) U.S. Cl.
CPC ........... *B60N 2/2839* (2013.01); *B60N 2/286* (2013.01); *B60N 2/2863* (2013.01); *B60N 2/2884* (2013.01); *B60N 3/063* (2013.01)

(58) Field of Classification Search
CPC .... B60N 2/2839; B60N 2/286; B60N 2/2863; B60N 2/2884; B60N 3/063
See application file for complete search history.

(56) References Cited

U.S. PATENT DOCUMENTS

| 4,480,870 A | * | 11/1984 | von Wimmersperg | ............ B60N 2/2809 297/216.11 |
| 5,722,720 A | * | 3/1998 | Lumley | ............ B60N 2/2863 297/216.11 |

(Continued)

FOREIGN PATENT DOCUMENTS

| AU | 2006203692 A1 | 3/2007 |
| EP | 0779175 A1 | 6/1997 |

(Continued)

OTHER PUBLICATIONS

Office Action issued in corresponding Canadian Application No. 3,023,122, dated Nov. 7, 2019, all enclosed pages cited.

(Continued)

*Primary Examiner* — Philip F Gabler
(74) *Attorney, Agent, or Firm* — K&L Gates LLP

(57) ABSTRACT

A convertible child safety seat may include a body configured to support an occupant, a base portion operably coupled to the body to support the body where the base portion is configured to be disposed on a vehicle seat base of a vehicle seat in either a forward facing configuration or a rearward facing configuration, and a multi-position anti-rebound bar. The anti-rebound bar may be operably coupled to the base portion or the body such that the anti-rebound bar is pivotable between at least a first position to provide a first function in the rearward facing configuration and a second position to provide a second function different than the first function in the forward facing configuration.

20 Claims, 14 Drawing Sheets

(56) References Cited

U.S. PATENT DOCUMENTS

| | | | | |
|---|---|---|---|---|
| 6,042,181 A * | 3/2000 | Goor | ............... | B60N 2/2806 |
| | | | | 297/216.11 |
| 6,139,099 A * | 10/2000 | Skold | ............... | B60N 2/28 |
| | | | | 297/216.11 |
| 8,136,881 B2 * | 3/2012 | Vertegaal | ............... | B60N 2/2824 |
| | | | | 297/253 |
| 9,434,279 B2 * | 9/2016 | Williams | ............... | B60N 2/2884 |
| 10,011,199 B2 * | 7/2018 | Clement | ............... | B60N 2/2851 |
| 10,112,550 B2 * | 10/2018 | Nickel | ............... | B60N 2/2827 |
| 2016/0121764 A1 | 5/2016 | Clement | | |
| 2018/0126877 A1 | 5/2018 | Williams | | |

FOREIGN PATENT DOCUMENTS

| | | | |
|---|---|---|---|
| GB | 2312834 A | 11/1997 | |
| NL | 9400114 A | 9/1995 | |

OTHER PUBLICATIONS

Office Action issued in corresponding European Application No. 18205086.4-1010, dated Mar. 29, 2019, all enclosed pages cited.

* cited by examiner

MULTI-POSITION ANTI-REBOUND BAR

CROSS REFERENCE TO RELATED APPLICATION

This application claims priority to U.S. application No. 62/582,971 filed Nov. 8, 2017, the entire contents of which are hereby incorporated by reference in its entirety.

TECHNICAL FIELD

Exemplary embodiments of the present disclosure generally relate to child safety seats, and more particularly, to a child safety seat having a multi-position anti-rebound bar.

BACKGROUND

Child safety seats (or simply child seats or car seats) are secured inside a vehicle to protect children in vehicles from the effects of either accidents, sudden deceleration, or other impacts or jarring events. The child safety seats may include various different protective features relating to securing the child safety seats in the vehicle, securing the child to the child safety seat, and protecting the child once the child is secured in the child safety seat. Some of these protective features may be prescribed by regulation in certain jurisdictions, but others may provide optional, additional protection for children. Thus, child safety seats can have a variety of different features, and even different structural arrangements for providing many of those features.

An anti-rebound bar is a feature that may be included on some child safety seats to prevent or reduce inertia-induced rotation of, for example, an infant carrier or other car seat, due to a sudden change in velocity. In this regard, for example, when a sudden deceleration is experienced, the child safety seat may initially feel inertia tending to move the child safety seat forward. This inertia may cause the child safety seat to lean or otherwise tend forward until the forward momentum is stopped and a rebound toward the rear is encountered. In some cases, cushioning of the vehicle seat base may exacerbate the rebound forces, and the child safety seat may rotate rearward about a pivot point that may be defined at or near the point at which the base of the child safety seat is secured to the vehicle seat (e.g., via the vehicle seat belt or a latch system). In a worst case scenario, the child safety seat may pivot with sufficient force to cause the top of the child safety seat to rotate enough to strike the vehicle seat back. The anti-rebound bar, when used, may be placed against the vehicle seat back to prevent or at least mitigate any such rebound forces.

BRIEF SUMMARY OF SOME EXAMPLES

Some example embodiments may enable the provision of a child safety seat having an easy to use, multi-position (and in some cases also multi-use) anti-rebound bar.

In one example embodiment, a convertible child safety seat is provided. The convertible child safety seat may include a body configured to support an occupant, a base portion operably coupled to the body to support the body where the base portion is configured to be disposed on a vehicle seat base of a vehicle seat in either a forward facing configuration or a rearward facing configuration, and a multi-position anti-rebound bar. The anti-rebound bar may be operably coupled to the base portion or the body such that the anti-rebound bar is pivotable between at least a first position to provide a first function in the rearward facing configuration and a second position to provide a second function different than the first function in the forward facing configuration.

In another example embodiment, a positioning assembly for positioning an anti-rebound bar of a child safety seat is provided. The child safety seat may include a body configured to support an occupant and a base portion operably coupled to the body to support the body. The base portion may be configured to be disposed on a vehicle seat base of a vehicle seat in either a forward facing configuration or a rearward facing configuration. The anti-rebound bar may be operably coupled to the base portion or the body such that the anti-rebound bar is pivotable between at least a first position to provide a first function in the rearward facing configuration and a second position to provide a second function different than the first function in the forward facing configuration. The positioning assembly may include at least a proximal end of the anti-rebound bar, and a base plate. The proximal end of the anti-rebound bar may be operably coupled to the base plate at a pivot axis. The base plate may include at least a first orifice and a second orifice equidistant from the pivot axis. The first orifice may correspond to the first position and the second orifice may correspond to the second position.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
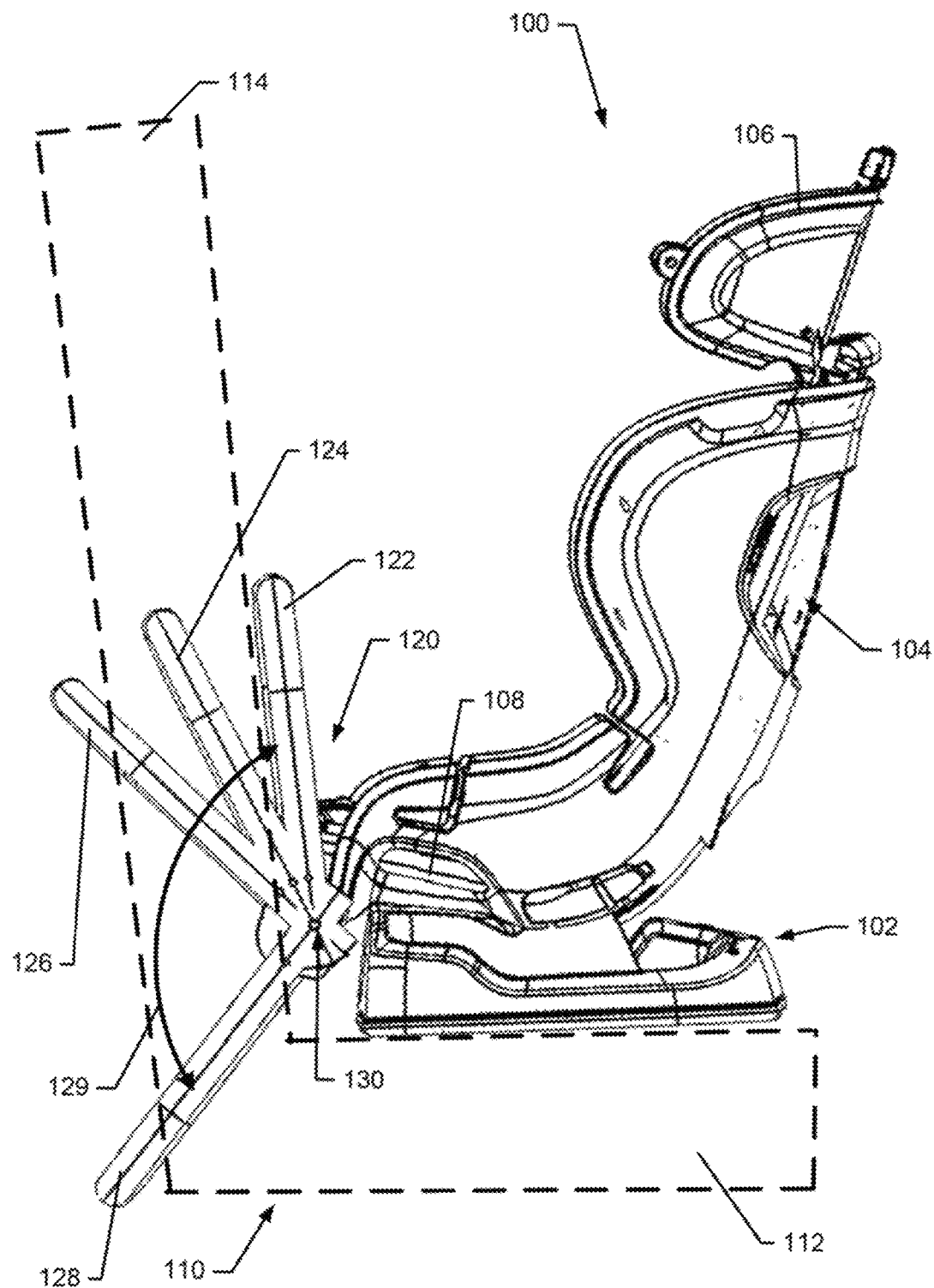
FIG. 1 illustrates a side view of a child safety seat employing a multi-position anti-rebound bar in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As a child grows, the changes in height and weight result in corresponding changes for the design and/or arrangement for the child safety seat that is to be used to secure the child within a vehicle. In the past, the child would be expected to transition through different individual child safety seats for various different ranges of height and weight. This can result in a need to buy several different models of child safety seat as the child progresses through childhood. For example, the child may have an infant car seat that is rear-facing only until the child reaches about 40 pounds. Thereafter, the child may be placed in a forward facing child safety seat until the child weighs about 80 pounds. After this, the child may move to booster seat until the child reaches, for example, about 120 pounds.

To eliminate the necessity for buying three different child safety seats to accommodate the weight ranges described above, the convertible car seat was developed. The convertible car seat may also be referred to as a 3-in-1 car seat since the convertible car seat is effectively a child safety seat that is capable of serving as each of the rear-facing infant car seat, the forward-facing car seat, and the booster seat with relatively minor structural changes to cause the corresponding transitions.

Although the 3-in-1 car seat is popular, some argue that the 3-in-1 car seat may be less safe for children than specific models that have been designed for children of a corresponding specific size. For example, convertible car seats typically do not have an anti-rebound bar since the anti-rebound bar would typically need to be removed or would otherwise provide a significant impediment to conversion. Example embodiments provide a solution for the design of a 3-in-1 convertible car seat that allows the anti-rebound bar feature to be employed. In this regard, some example embodiments provide for a multi-use anti-rebound bar that can be easily repositioned and have a function in each respective different configuration for the convertible car seat. Example embodiments may also enable reconfiguration of the child safety seat in the rear facing configuration to increase the comfort of the child as the child grows, which may encourage parents to keep children rear facing as long as possible to improve child safety.

The convertible car seat may be considered to be in a forward (or front) facing configuration when the convertible car seat has its back portion against the back of the vehicle seat so that the convertible car seat receives an occupant in a direction that extends from the front to back of the vehicle. The convertible car seat may be considered to be in a rearward (or rear) facing configuration when the convertible car seat has its back portion disposed spaced apart from (and opposite to) the back of the vehicle seat so that the convertible car seat receives an occupant in a direction that extends from the back to front of the vehicle. However, the front of the convertible car seat is always (regardless of the configuration of the convertible car seat within the vehicle) the side opposite the back portion of the convertible car seat. Likewise, the rear or back of the convertible car seat is always that side at which the back portion of the convertible car seat is located (regardless of the configuration of the convertible car seat within the vehicle).

Figure 2:
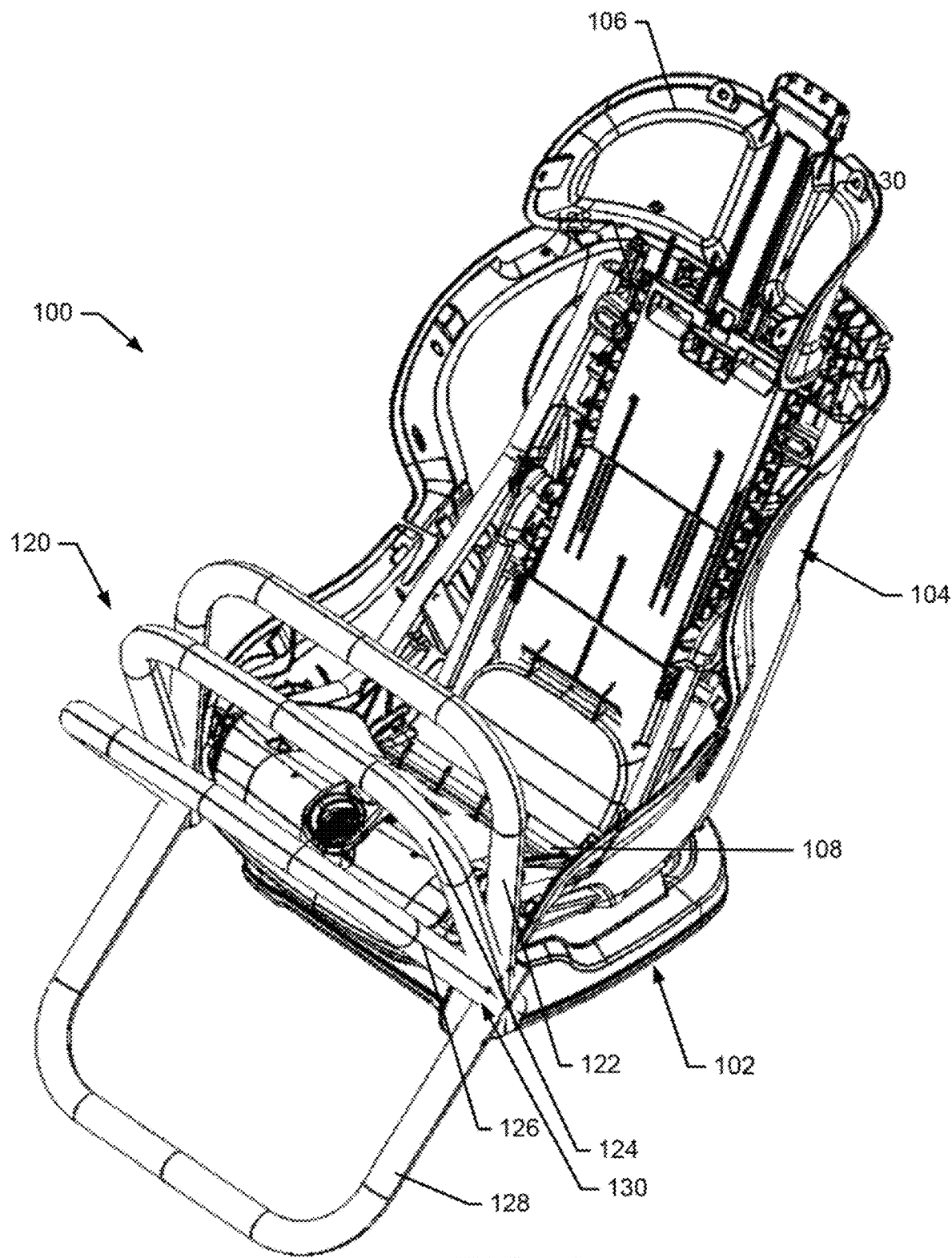
FIG. 2 illustrates a perspective view of the child safety seat of FIG. 1 in accordance with an example embodiment.

A child safety seat 100 (e.g., a convertible car seat) of an example embodiment is shown in FIGS. 1 and 2. The child safety seat 100 of FIGS. 1 and 2 is shown with padding, restraints and fabric removed. However, it should be appreciated that such additional components, and perhaps also other structures for the child safety seat 100 may also be employed including, for example, various additional safety or convenience features. The arrangement and positions of various features, accessories and other structures may be altered in accordance with many such designs. Thus, the child safety seat 100 of FIGS. 1 and 2 should be appreciated as merely being one non-limiting example of a structure that may employ an example embodiment.

FIGS. 1 and 2 illustrate a side view and a front perspective view, respectively, of the child safety seat 100, which may employ a multi-use anti-rebound bar in accordance with an example embodiment. Of note, the specific structures and arrangements of components that form the child safety seat 100, and the anti-rebound bar of FIGS. 1 and 2 are merely exemplary of one type of arrangement that could employ an example embodiment. Thus, particularly the specific structures that are unrelated to the anti-rebound bar of the child safety seat 100 should be appreciated as being merely exemplary and non-limiting. It should also be appreciated that the child safety seat 100 of FIGS. 1 and 2 is shown with the anti-rebound bar in each of the multiple possible positions in which the anti-rebound bar may be disposed. Thus, the four positions shown in FIGS. 1 and 2 would be individually and separately instantiated at different times and not all present at once. The illustrations of FIGS. 1 and 2 should therefore be appreciated as being useful for comparatively analyzing the different positions that can be achieved by example embodiments.

As shown in FIGS. 1 and 2, the child safety seat 100 may include at least a base portion 102 and a back portion 104, and may be configured to be secured to a vehicle seat 110 (shown in dashed lines only in FIG. 1) of a vehicle. In some cases, additional features for enhancing safety or ease of use of the child safety seat 100 may also be employed in connection with either the base portion 102 or the back portion 104. For example, the head rest 106 may be included, and may be extendible to accommodate transitions between configurations of the child safety seat 100. In some cases, the base portion 102 may include or otherwise support a seat portion 108, on which the child may sit within the child safety seat 100. The seat portion 108 and the back portion 104 may, in combination, form or otherwise be referred to as a body of the child safety seat 100. The body of the child safety seat 100 may be supported (e.g., rigidly or slidably) by the base portion 102.

The child safety seat 100 may also include a harness or other retaining assembly for securely and comfortably securing the child within the child safety seat 100. Additionally, a latch system may be provided for securing the base portion 102 to vehicle latch anchors (e.g., between a vehicle seat base 112 and a vehicle seat back 114 of the vehicle seat 110). In some cases, a seat belt tensioning mechanism may be included to enable use of a vehicle seat belt as a means by which to secure the child safety seat 100 to the vehicle seat 110. Regardless of the other methods and structures that may be employed to secure the child safety seat 100 to the vehicle seat 110, an anti-rebound bar 120 of an example embodiment may also be employed.

In an example embodiment, the seat portion 108 and the back portion 104 may be configured to recline or otherwise be repositionable with respect to the base portion 102. If the anti-rebound bar 120 had only a single position, reclining or otherwise repositioning the seat portion 108 and the back portion 104 relative to the base portion 102 may create undesirable space between the anti-rebound bar 120 and the vehicle seat back 114. To minimize space between the anti-rebound bar 120 and the vehicle seat back 114 over different recline positions, or for different vehicle seat configurations, the anti-rebound bar 120 may be positionable to a plurality of different positions for corresponding different anti-rebound configurations. The example of FIGS. 1 and 2 shows a first position 122, a second position 124 and a third position 126 for the anti-rebound bar 120 and each of these positions may correlate to different recline positions or portions of a range of recline positions. However, as mentioned above, the child safety seat 100 may also be reconfigurable from rear facing (which is shown in FIG. 1) to forward facing configurations. When the child safety seat 100 is forward facing, the anti-rebound bar 120 may be moved to a fourth position 128 at which point the anti-rebound bar 120 may serve as a foot or calf support. A positioning assembly 130 may be provided to facilitate repositioning (i.e., pivoting or rotating) and retaining the anti-rebound bar 120 in each of the predefined positions between which the anti-rebound bar 120 is configured to transition (i.e., the first, second, third and fourth positions 122, 124, 126 and 128). In this regard, as shown in FIG. 1, the positioning assembly 130 may be used to transition the anti-rebound bar 120 through a full range of motion or positions shown by double arrow 129.

Figure 3:
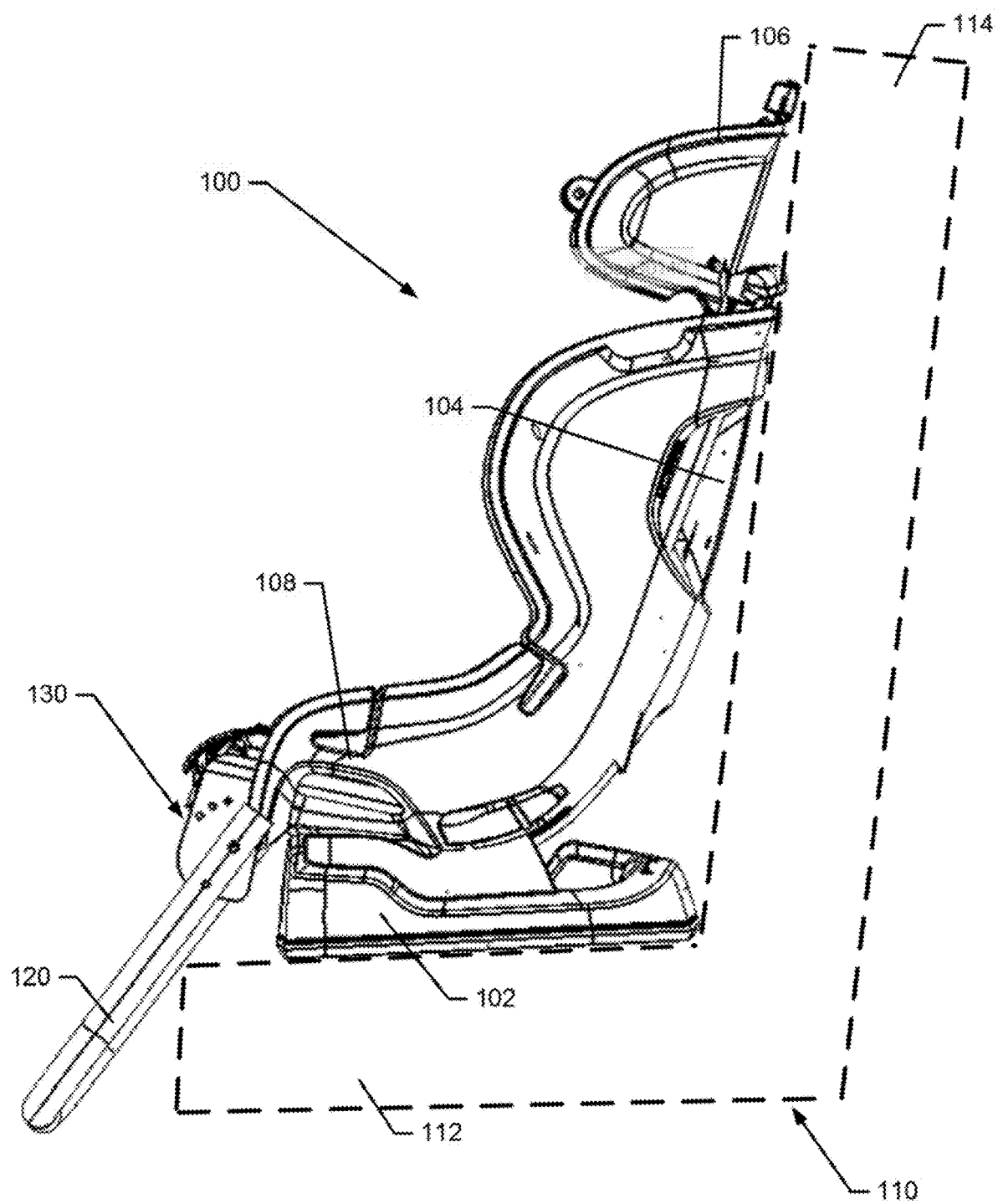
FIG. 3 illustrates a side view of the child safety seat in one of the use specific positions of the anti-rebound bar in accordance with an example embodiment.
Figure 4:
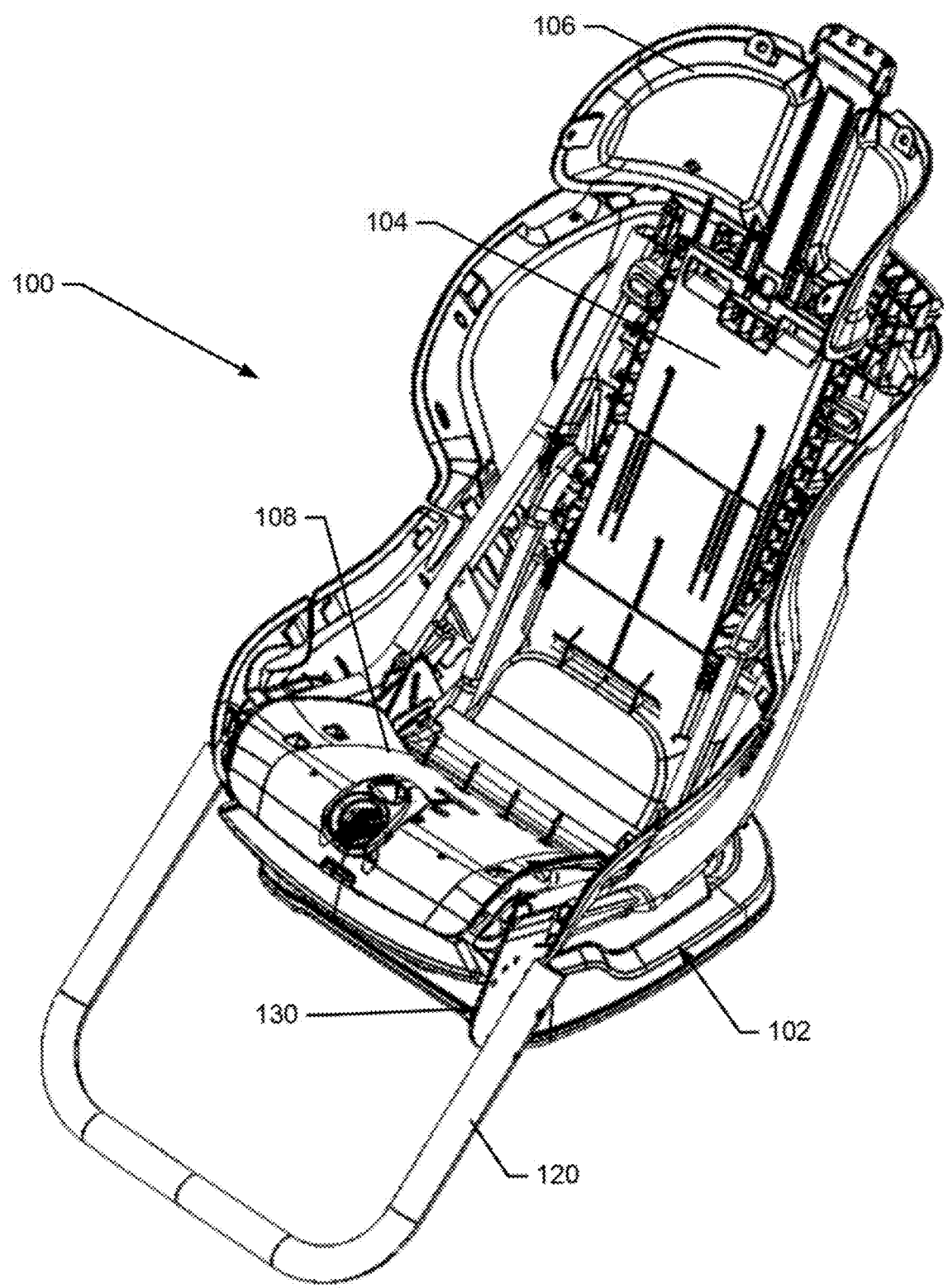
FIG. 4 illustrates a perspective view of the child safety seat of FIG. 3 in accordance with an example embodiment.

FIGS. 3 and 4 illustrate the child safety seat 100 with the anti-rebound bar 120 in the fourth position 128 of FIGS. 1 and 2. In this regard, FIG. 3 illustrates a side view of the child safety seat 100 disposed on the vehicle seat 110 in a forward facing configuration, and FIG. 4 illustrates a perspective view of the child safety seat 100 with the anti-rebound bar 120 in the fourth position 128. As shown in FIG. 3, when the anti-rebound bar 120 is in the fourth position 128, the anti-rebound bar 120 extends downward to pass through a plane in which the vehicle seat base 112 lies, whereas in each other position (e.g., the first position 122, the second position 124 and the third position 126 of FIGS. 1 and 2), the anti-rebound bar 120 may be configured to extend above and away from the plane in which the vehicle seat base 112 lies. Moreover, in at least some of the other positions, the anti-rebound bar 120 may extend substantially parallel to a plane in which the vehicle seat back 114 lies. However, as a child gets older, the child may feel as though he/she does not have enough room for his/her legs. The second and third positions 124 and 126 provide options that allow the child safety seat 100 to be positioned farther away from the vehicle seat 110 (and also farther from parallel with the vehicle seat back 114). The child may also be retained in a more upright and reclined position. Thus, the comfort of the child may be increased while maintaining the child rear facing for as long as possible.

Figure 5:
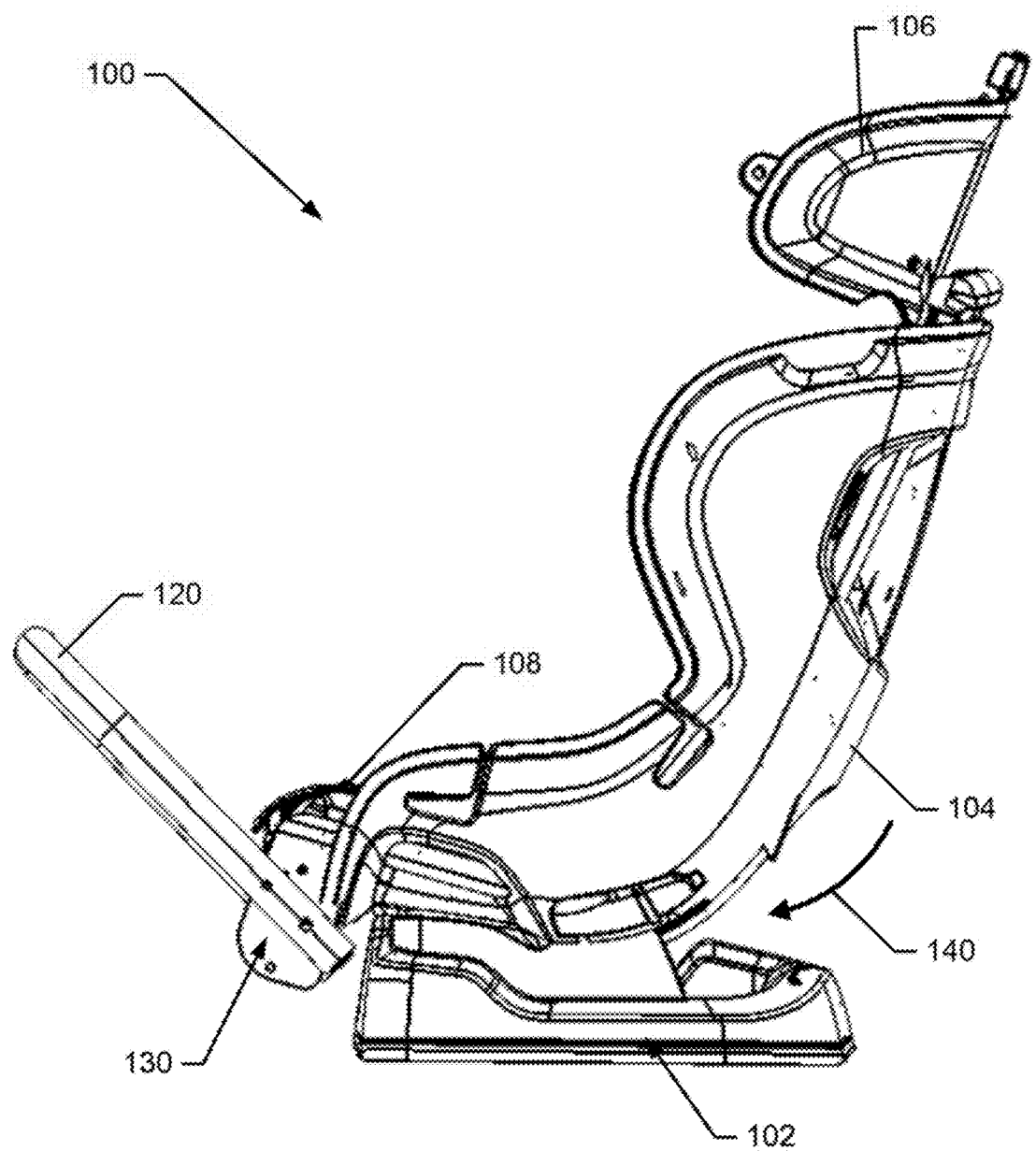
FIG. 5 illustrates a side view of a child safety seat in another one of the use specific positions of the anti-rebound bar in accordance with an example embodiment.
Figure 6:
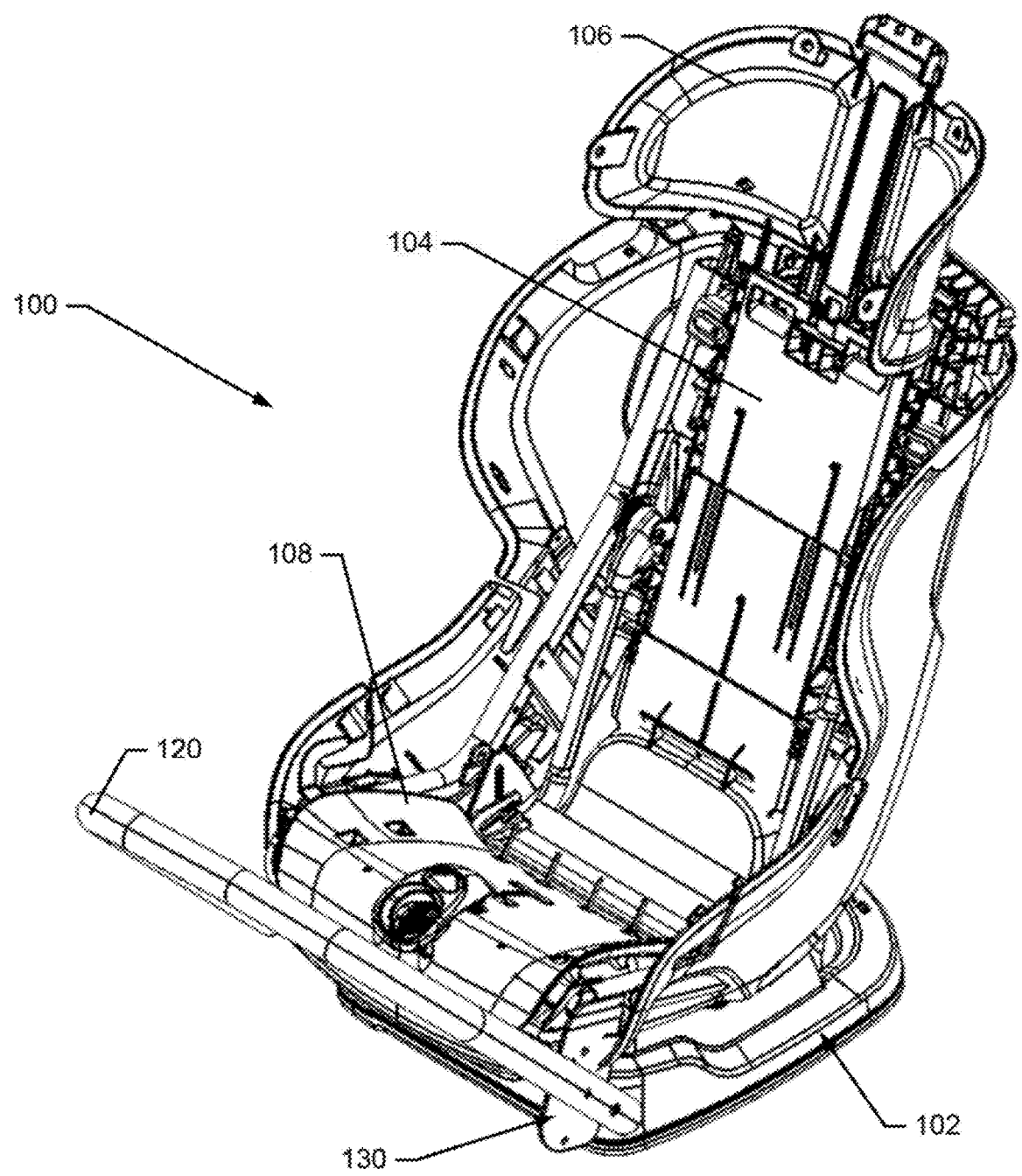
FIG. 6 illustrates a perspective view of the child safety seat of FIG. 5 in accordance with an example embodiment.

FIGS. 5 and 6 illustrate the child safety seat 100 with the anti-rebound bar 120 in the third position 126 of FIGS. 1 and 2. In this regard, FIG. 5 illustrates a side view of the child safety seat 100, and FIG. 6 illustrates a perspective view of the child safety seat 100 with the anti-rebound bar 120 in the third position 126. As shown in FIG. 5, when the anti-rebound bar 120 is in the third position 126, the anti-rebound bar 120 extends above and away from the plane in which the bottom of the base portion 102 lies. Moreover, it should be appreciated that the back portion 104 and the seat portion 108 of the child safety seat 100 could be pivoted relative to the base portion 102 as shown by the arrow 129. Pivoting (e.g., for seat reclining) may change the angle between the plane in which the bottom of the base portion 102 lies and the anti-rebound bar 120. In this regard, the angle between the plane in which the bottom of the base portion 102 lies and the anti-rebound bar 120 in FIG. 5 is a relatively large obtuse angle (e.g., about 120 degrees). By rotating or pivoting the back portion 104 and the seat portion 108 of the child safety seat 100 relative to the base portion 102 in the direction of arrow 140, the angle would be decreased.

Figure 7:
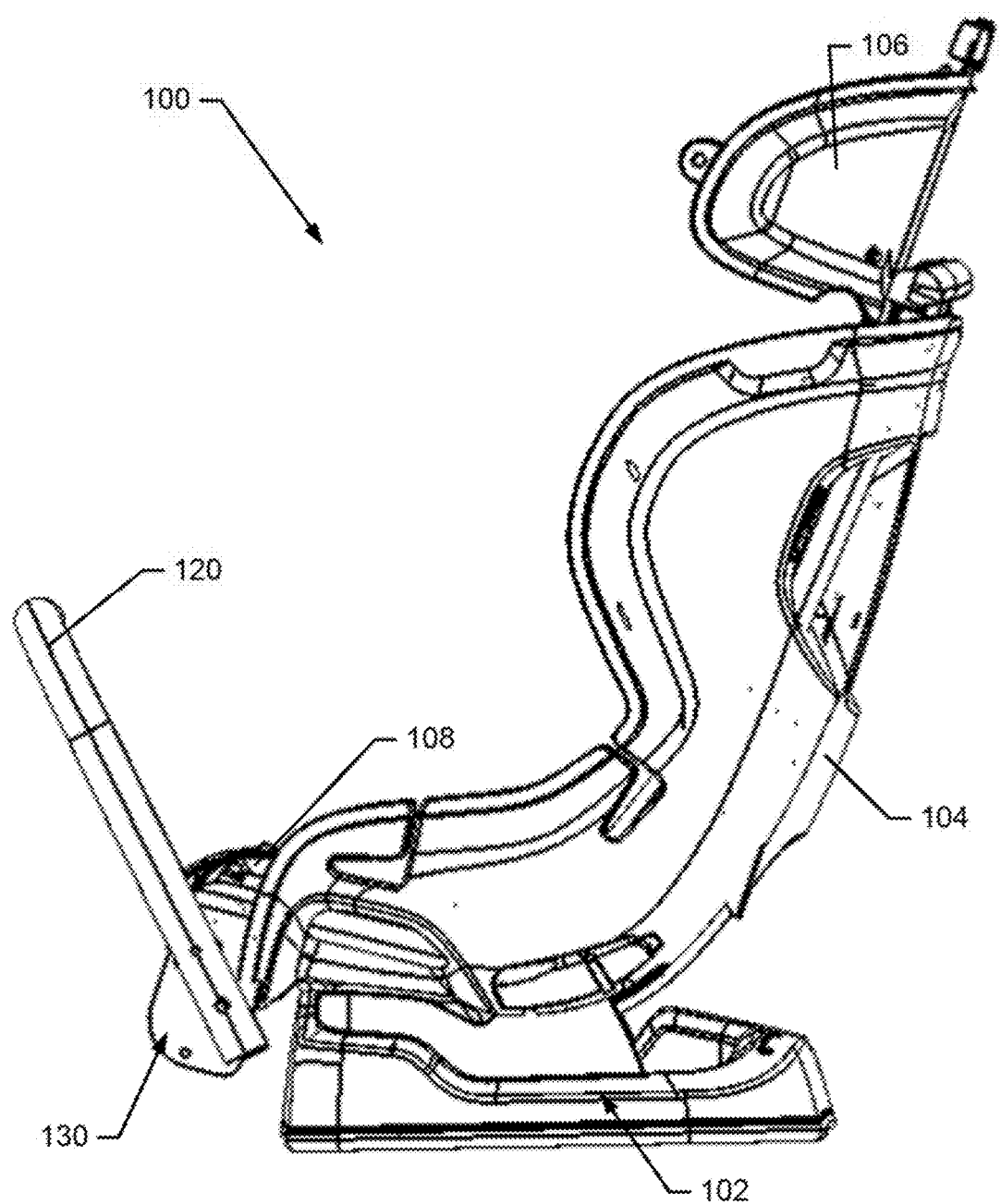
FIG. 7 illustrates a side view of a child safety seat in yet another one of the use specific positions of the anti-rebound bar in accordance with an example embodiment.
Figure 8:
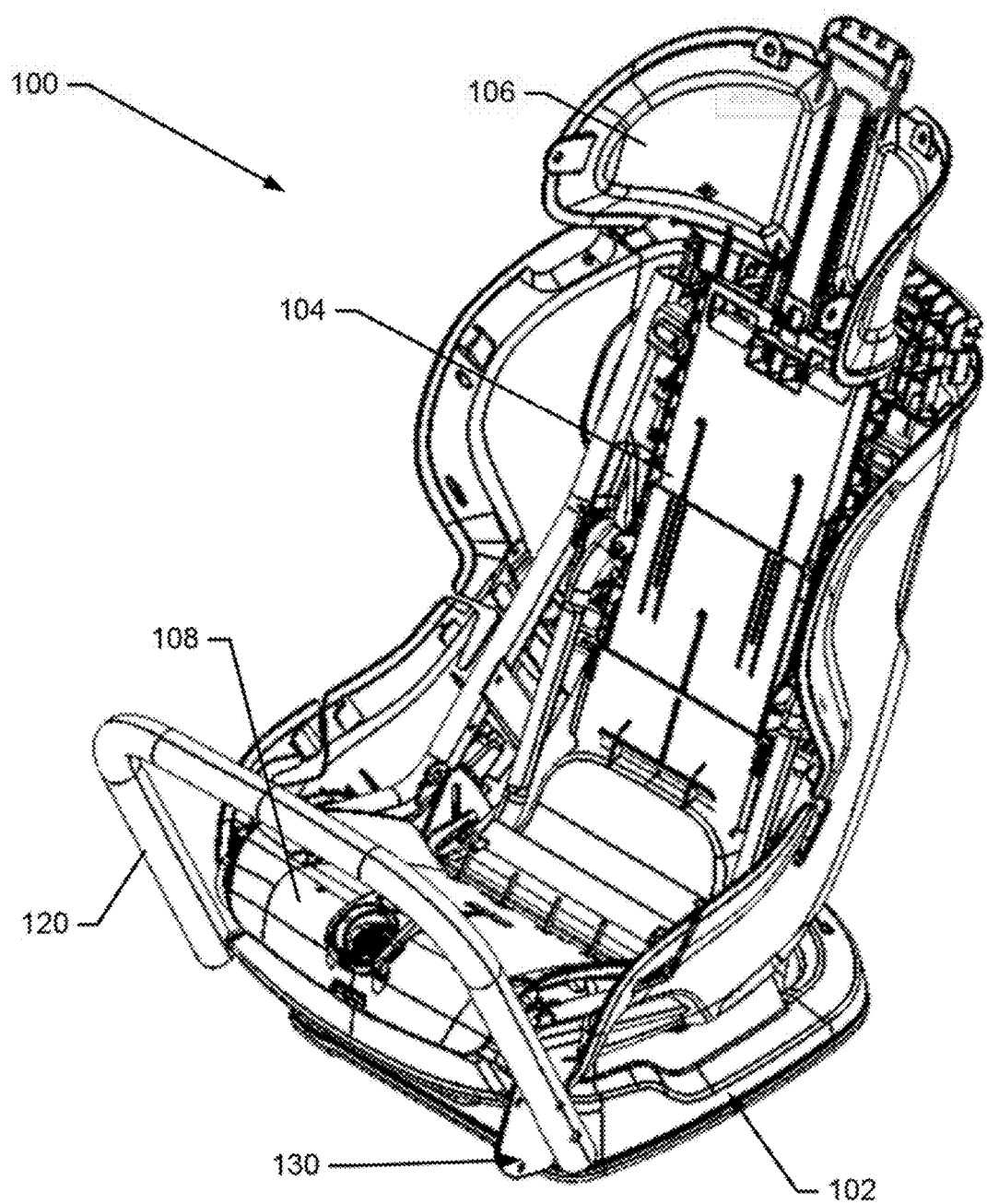
FIG. 8 illustrates a perspective view of the child safety seat of FIG. 7 in accordance with an example embodiment.

FIGS. 7 and 8 illustrate the child safety seat 100 with the anti-rebound bar 120 in the second position 124 of FIGS. 1 and 2. In this regard, FIG. 7 illustrates a side view of the child safety seat 100, and FIG. 8 illustrates a perspective view of the child safety seat 100 with the anti-rebound bar 120 in the second position 124. As shown in FIG. 7, when the anti-rebound bar 120 is in the second position 124, the anti-rebound bar 120 extends above and away from the plane in which the bottom of the base portion 102 lies to form an angle between the plane in which the bottom of the base portion 102 lies and the anti-rebound bar 120 that is still obtuse, but smaller than the corresponding angle shown in FIG. 5.

Figure 9:
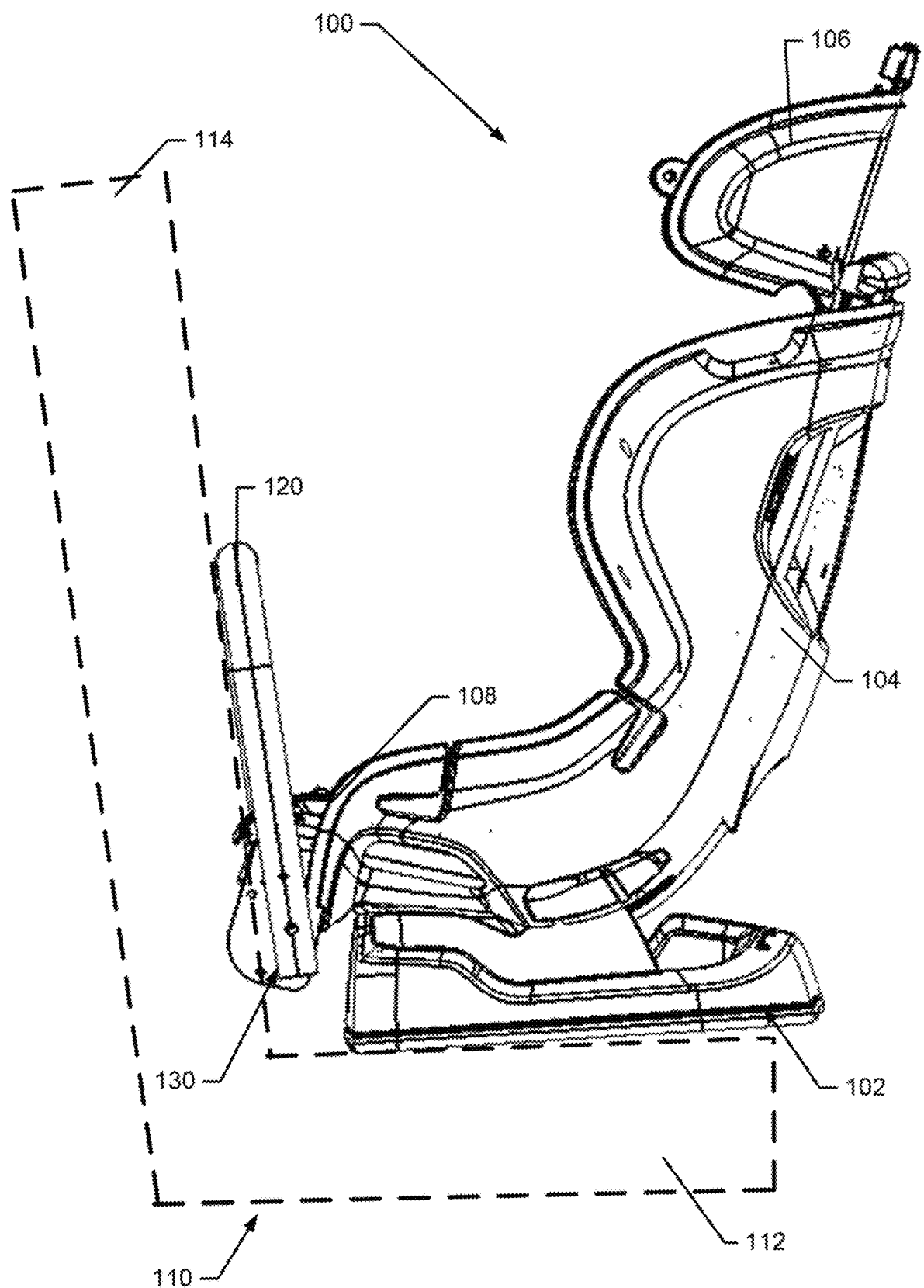
FIG. 9 illustrates a side view of a child safety seat in still another one of the use specific positions of the anti-rebound bar in accordance with an example embodiment.
Figure 10:
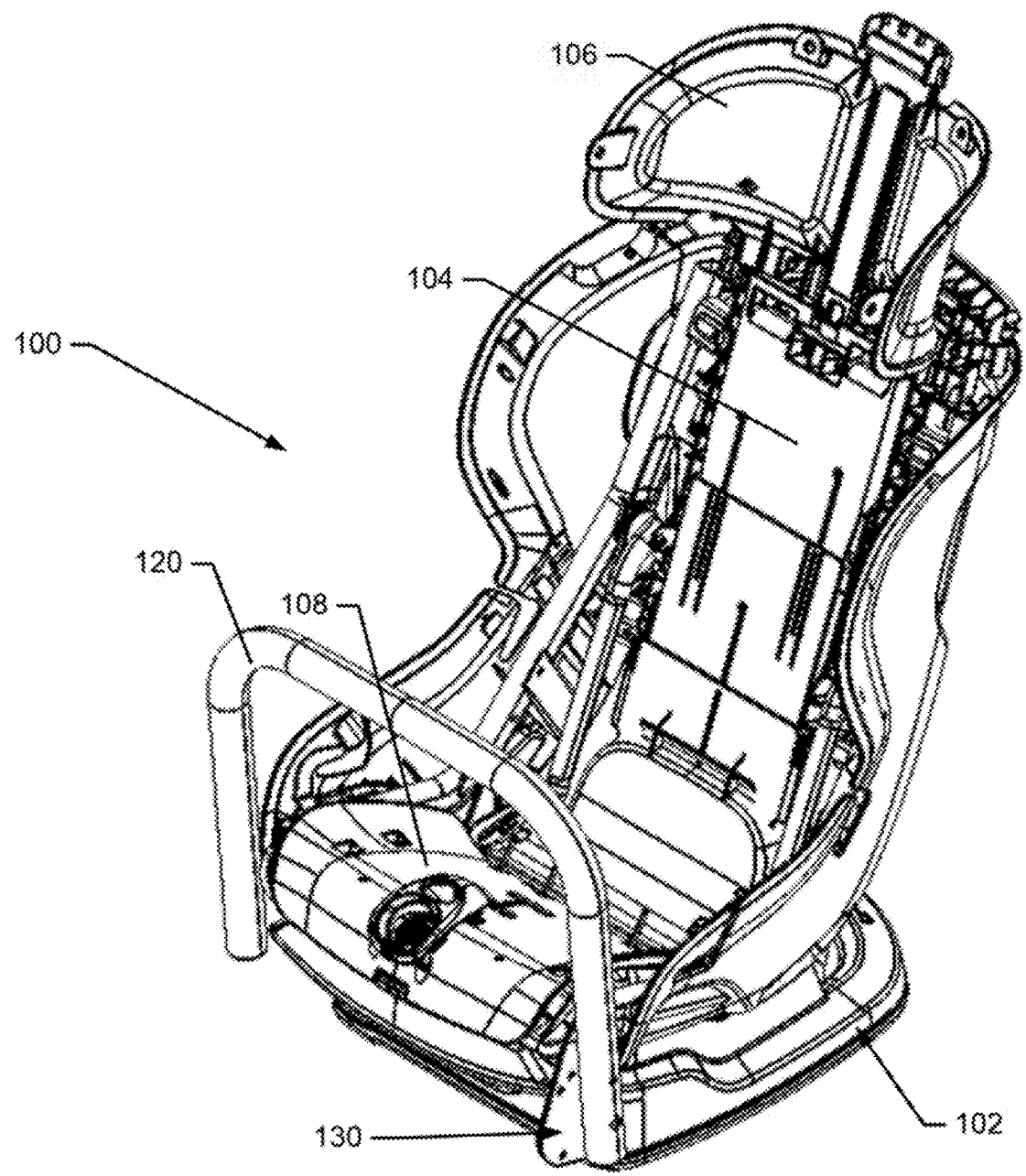
FIG. 10 illustrates a perspective view of the child safety seat of FIG. 9 in accordance with an example embodiment.

FIGS. 9 and 10 illustrate the child safety seat 100 with the anti-rebound bar 120 in the first position 122 of FIGS. 1 and 2. In this regard, FIG. 9 illustrates a side view of the child safety seat 100 disposed on the vehicle seat 110 in the rearward facing configuration, and FIG. 10 illustrates a perspective view of the child safety seat 100 with the anti-rebound bar 120 in the first position 122. As shown in FIG. 9, when the anti-rebound bar 120 is in the first position 122, the anti-rebound bar 120 extends above and away from the plane in which the bottom of the base portion 102 lies. Moreover, as can be appreciated from FIG. 9, the angle between the plane in which the bottom of the base portion 102 lies and the anti-rebound bar 120 is about 90 degrees. Thus, for example, in the first position 122, the anti-rebound bar 120 may extend substantially perpendicularly away from the plane in which the bottom of the base portion 102 lies.

Generally speaking, the fourth position 128 of the anti-rebound bar 120 may only be achievable in the forward facing configuration for the child safety seat 100 (as shown in FIG. 3). Meanwhile, the first, second and third positions 122, 124 and 126 of the anti-rebound bar 120 may be achievable in either the forward facing configuration (of FIG. 3) or the rearward facing configuration (of the example of FIG. 1). When the child safety seat 100 is in the rearward facing configuration, the anti-rebound bar 120 may be placed in an orientation (e.g., via operation of the positioning assembly 130) that, for a given recline orientation, places the anti-rebound bar 120 substantially parallel to the plane in which the vehicle seat back 114 lies. Moreover, the anti-rebound bar 120 may also be placed proximate to the vehicle seat back 114. In this configuration, the anti-rebound bar 120 is configured to prevent rebounding as described above. When the child safety seat 100 is in the forward facing configuration, the anti-rebound bar 120 may be configured into a different use than that of a rebound prevention or mitigation device. In this regard, when in the forward facing configuration, the anti-rebound bar 120 may serve as a foot rest (i.e., for shorter children) or a calf rest (i.e., for taller children). Accordingly, for example, the first, second and third positions 122, 124 and 126 may each be examples of a first use-specific position for the anti-rebound bar 120, and the fourth position 128 may be an example of a second use-specific position for the anti-rebound bar 120. In the second use-specific position, the anti-rebound bar 120 may extend downward through a plane in which the bottom of the base portion 102 lies for a non-safety related function (e.g., occupant comfort as a foot or calf rest). Meanwhile, in the first use-specific position, the anti-rebound bar 120 may extend upward and way from the plane in which the bottom of the base portion 102 lies for a safety related function (e.g., prevention of rebound rotation).

As can be appreciated from FIGS. 1-10, in the forward facing configuration, the anti-rebound bar 120 may be repositioned between a first orientation in which the anti-rebound bar 120 extends upward and substantially perpendicularly away from (and not through) the plane in which the bottom of the base portion 102 lies to a second orientation in which the anti-rebound bar 120 extends downward through the plane in which the bottom of the base portion 102 lies. However, in the rearward facing configuration, the anti-rebound bar 120 may be repositioned between the first orientation in which the anti-rebound bar 120 extends upward and substantially perpendicularly away from (and not through) the plane in which the bottom of the base portion 102 lies to a third orientation in which the anti-rebound bar 120 extends upward and away from (and again not through) the plane in which the bottom of the base portion 102 lies to form an obtuse angle.

Figure 11:
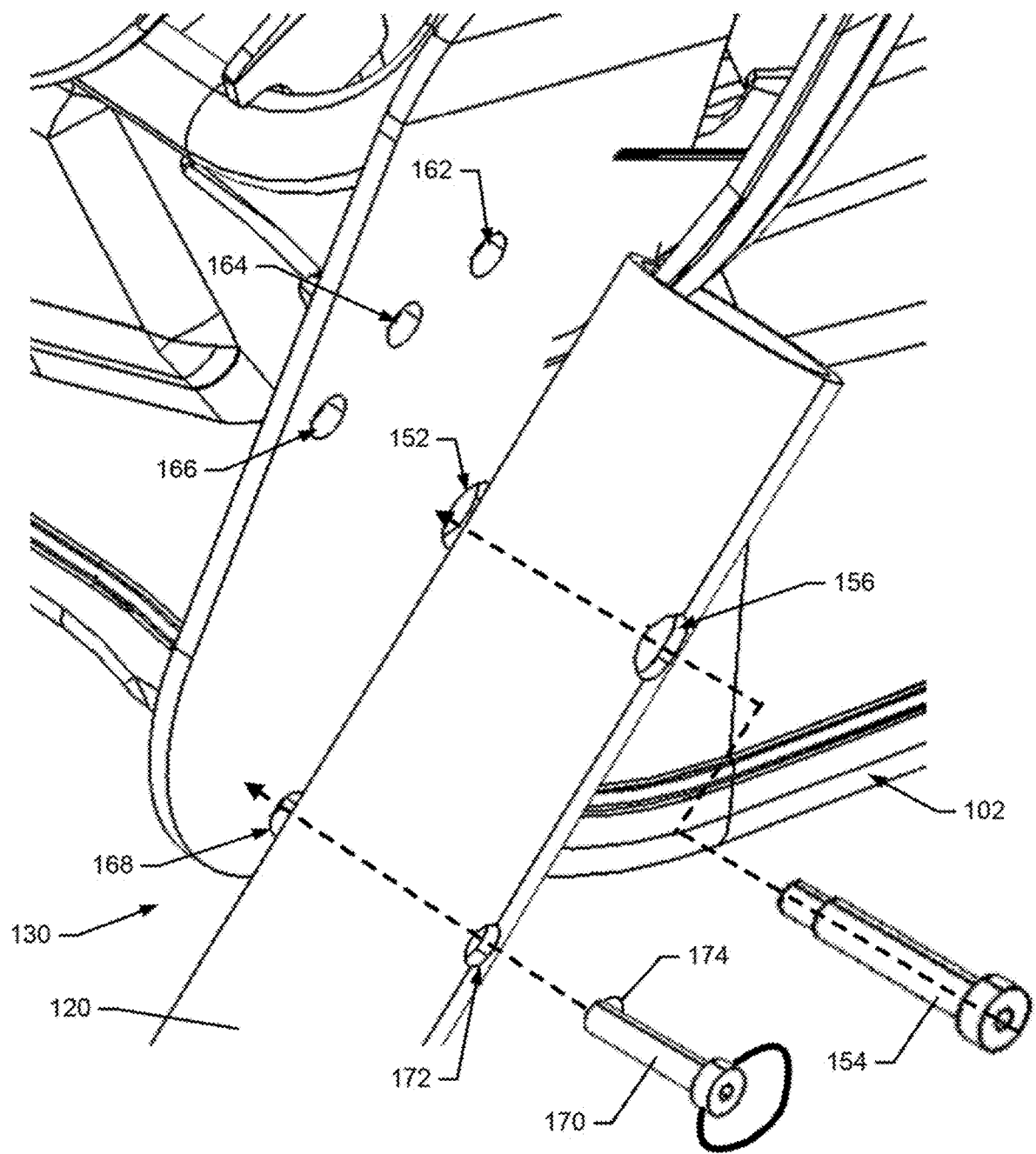
FIG. 11 illustrates a perspective view of a positioning assembly in accordance with an example embodiment.

As discussed above, the positioning assembly 130 may be used to enable the anti-rebound bar 120 to be moved to and retained in each of the predefined positions. However, it should be appreciated that the positioning assembly 130 may be embodied in a number of different ways and via a number of different physical structures. FIG. 11 illustrates a perspective view of one physical structure that may be used for the positioning assembly in accordance with an example embodiment.

The anti-rebound bar 120 may extend from the base portion 102 or the seat portion 108 (or from the body of the child safety seat 100) at an opposite side thereof with respect to the back portion 104 via the positioning assembly 130. Thus, the anti-rebound bar 120 may extend from the front of the child safety seat 100 and, more specifically, from opposing right and left sides of the front of the child safety seat 100. In some cases, the positioning assembly 130 may include a base plate 150 configured to define each of the predefined positions, and may be disposed at one of the right or left sides of the front of the child safety seat 100. The base plate 150 of an example embodiment may define each of the predefined positions via a corresponding number of holes, slots or orifices that may be formed in the base plate 150. In this regard, as shown in FIG. 11, the base plate 150 may lie in a plane that is substantially perpendicular to the plane in which the bottom of the base portion 102 of the child safety seat 100 lies. Thus, when the anti-rebound bar 120 is moved through the range of motion shown by double arrow 129, proximal ends (relative to the base plate 150) of the anti-rebound bar 120 may move in a plane that is substantially parallel to the plane in which the base plate 150 lies.

The base plate 150 may also include a pivot orifice 152 through which an axle 154, rod or other retaining apparatus that may be passed. The axle 154 may also be passed through a through-hole 156 disposed near a proximal end of the anti-rebound bar 120. The axle 154 may therefore operably couple the base plate 150 and the anti-rebound bar 120 together in such a way that allows the anti-rebound bar 120 to pivot or rotate relative to the base plate 150. As such, the axle 154 may act as a pivot axis about which the anti-rebound bar 120 may rotate. In some cases, the base plate 150 may be made of rigid plastic. However, in other examples, the base plate 150 may be a metallic component. Likewise, the anti-rebound bar 120 may be either a metallic component or a rigid component made of other materials such as plastic or composite materials.

The base plate 150 may also include a first orifice 162 corresponding to the first position 122 of FIGS. 1 and 2, a second orifice 164 corresponding to the second position 124 of FIGS. 1 and 2, a third orifice 166 corresponding to the third position 126 of FIGS. 1 and 2, and a fourth orifice 168 corresponding to the fourth position 128 of FIGS. 1 and 2. The first, second, third and fourth orifices 162, 164, 166 and 168 may each pass perpendicularly through the base plate 150 (or be formed as depressions in the surface of the base plate 150) to enable a retaining pin 170 to be passed through a retaining orifice 172 formed in the anti-rebound bar 120 and into a corresponding one of the first, second third and fourth orifices 162, 164, 166 and 168 to retain the anti-rebound bar 120 in a corresponding one of the first, second, third or fourth position 122, 124, 126 or 128.

The first, second, third and fourth orifices 162, 164, 166 and 168 may each be spaced apart from the pivot orifice 152 by a distance that is substantially equal to a distance between the retaining orifice 172 and the through-hole 156. Thus, when the anti-rebound bar 120 is pivoted about the axle 154 to a point at which the retaining orifice 172 aligns with any one of the first, second, third or fourth orifices 162, 164, 166 or 168, the retaining pin 170 may be passed through the retaining orifice 172 and the corresponding one of the first, second, third or fourth orifices 162, 164, 166 or 168 to lock the anti-rebound bar 120 in either the first, second, third or fourth position 122, 124, 126 or 128, respectively. As illustrated in FIG. 11, the pivot orifice 152 may be positioned relatively nearer a rear edge of the base plate 150, and the first orifice 162 may be positioned substantially above the pivot orifice 152, while the second and third orifices 164 and 166 are forward and above the pivot orifice 152 and the fourth orifice 168 is forward and below the pivot orifice 152.

The retaining pin 170 of FIG. 11 is embodied as a locking pin with a ball lock 174. Thus, the retaining pin 170 may be passed through the retaining orifice 172 and any one of the first, second, third or fourth orifices 162, 164, 166 or 168 and the ball of the ball lock 174 may be depressed to allow passage through each respective orifice, but then extend when passed entirely through both the retaining orifice 172 and any one of the first, second, third or fourth orifices 162, 164, 166 or 168 to keep the retaining pin 170 from withdrawing from its position. The retaining pin 170 may include a ring that may be tethered to a portion of the child safety seat 100 to prevent loss of the retaining pin 170. Although, a ball lock 174 is shown in FIG. 11, it should be appreciated that other locking mechanisms could be employed in alternative embodiments. For example, a snap lock, wire lock, cotter pin, tab lock pin, and/or the like could be used on the retaining pin 170 in alternative embodiments.

Figure 12:
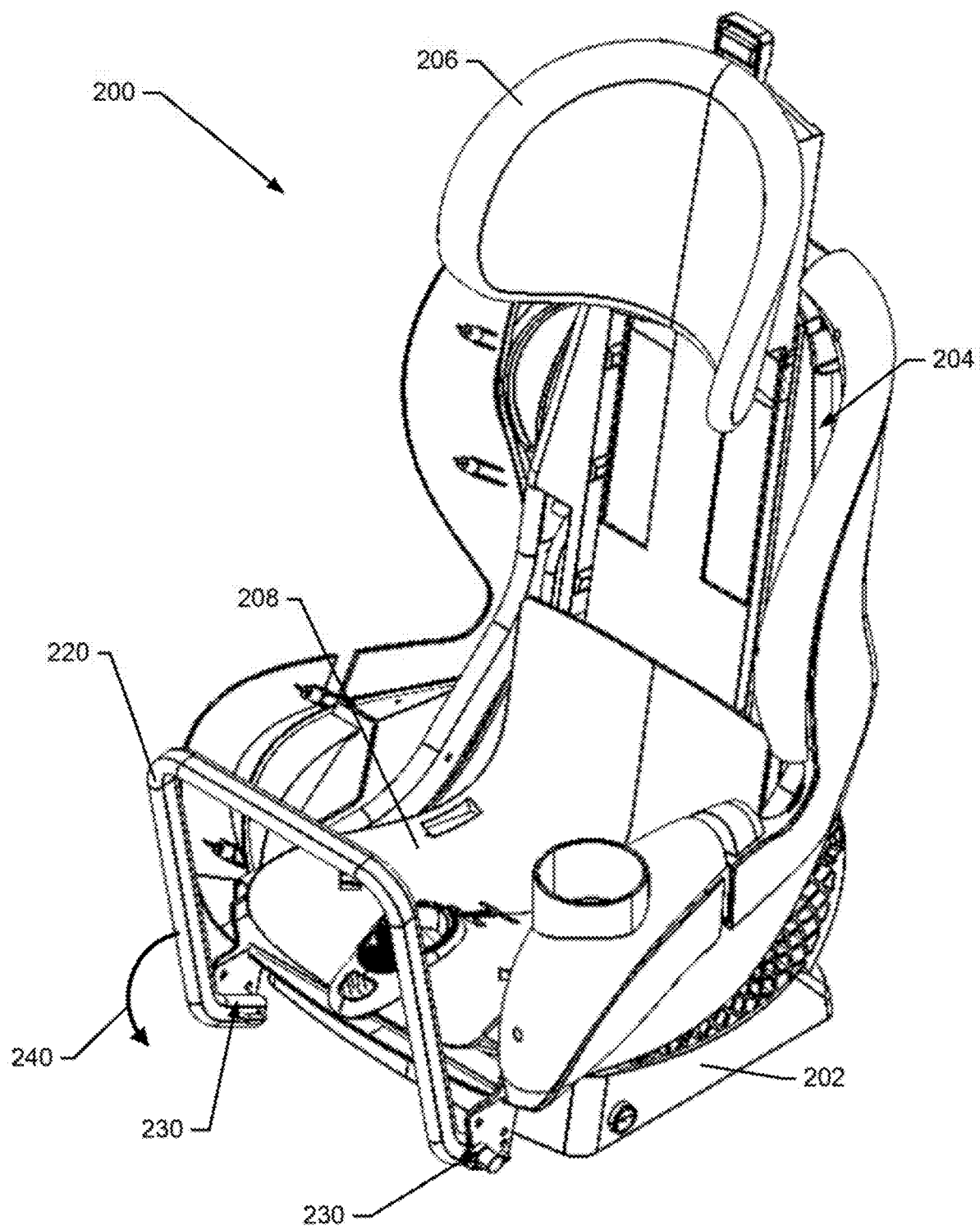
FIG. 12 illustrates a perspective view of an alternative structure for a child safety seat and anti-rebound bar in accordance with an example embodiment.
Figure 13:
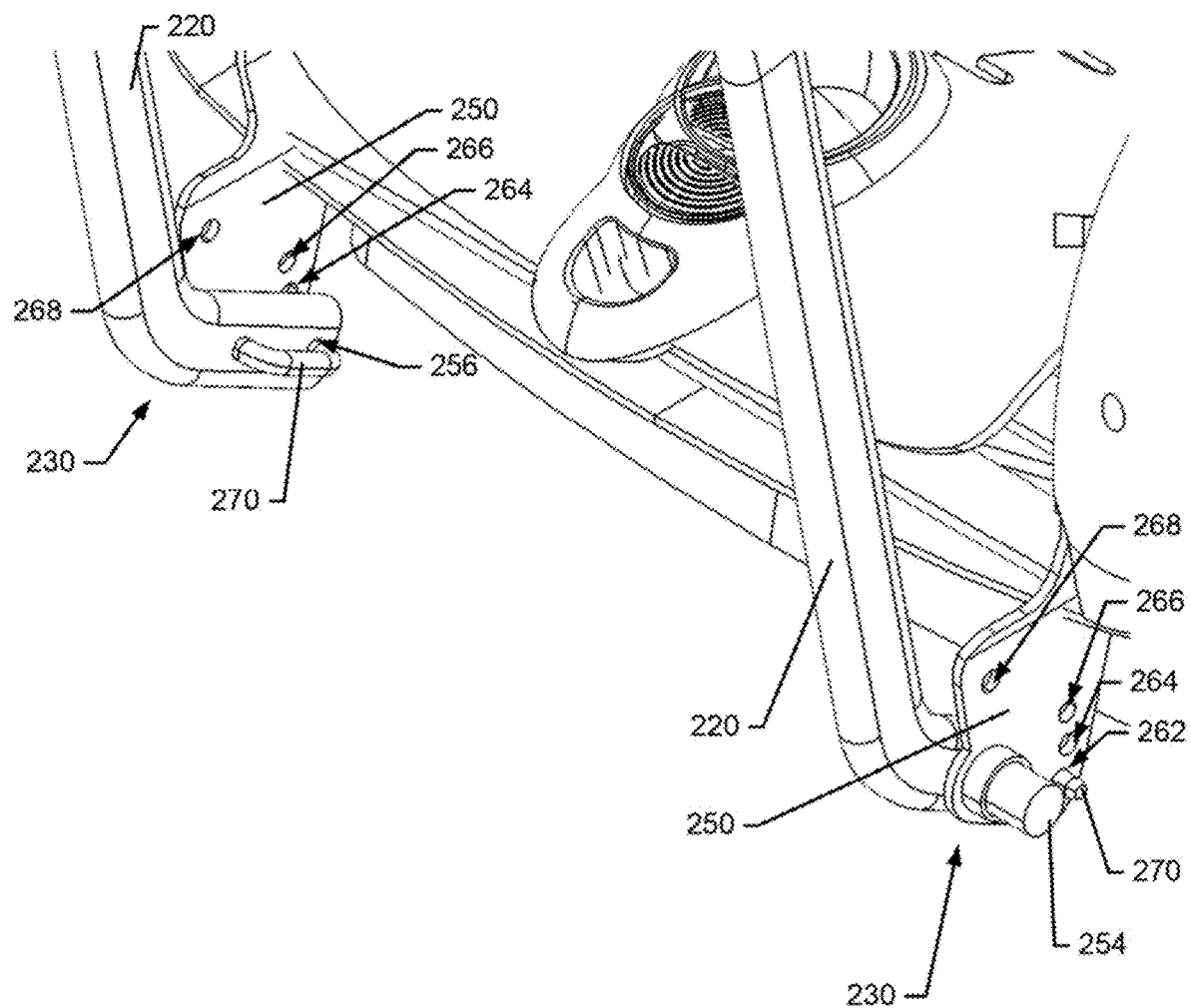
FIG. 13 illustrates a perspective view of two positioning assemblies associated with the example of FIG. 12 in accordance with an example embodiment.

In the example of FIGS. 1-11, only one instance of the positioning assembly 130 is included. Thus, for example, only one instance of the base plate 150 may be formed to include the predefined positions associated with the first, second, third and fourth orifices 162, 164, 166 and 168. In the pictured example, the base plate 150 is located on a left, front portion of the child safety seat 100. Meanwhile, a base plate at the right, front portion of the child safety seat 100 may only include a single orifice for receiving an axle about which the corresponding proximal end of the anti-rebound bar 120 may also rotate. Thus, although rotation of the anti-rebound bar 120 is supported from two locations, only one of the locations (i.e., the one with the base plate 150) may be used for selecting a position for the anti-rebound bar 120 and retaining of the anti-rebound bar 120 in the selected position. However, alternative structures are possible where, for example, both rotation and locking of the anti-rebound bar is accomplished from two locations instead of one. FIGS. 12 and 13 illustrate such an example.

Referring now to FIGS. 12 and 13, an alternative structure for a child safety seat 200 is illustrated. The child safety seat 200 may include a base portion 202, back portion 204, head rest 206, and/or seat portion 208 similar to the structure discussed above. However, anti-rebound bar 220 is operably coupled to the seat portion 208 (or base portion 202) via two instances of positioning assembly 230 on opposite ends of the anti-rebound bar 220. Although the anti-rebound bar 120 of the example shown in FIGS. 1-11 is a substantially U shaped bar that lies entirely within a plane, the anti-rebound bar 220 of FIGS. 12 and 13 is embodied as a substantially U shaped bar that lies in a plane except that proximal ends of the anti-rebound bar 220 are bent out of the plane in the same direction. The structure of the positioning assemblies 230 of the example of FIGS. 12 and 13 therefore enables a different locking arrangement and allows a different placement and orientation for the orifices that define the predefined positions of the anti-rebound bar 220.

Referring primarily to FIG. 13, each of the positioning assemblies 230 may include an instance of base plate 250. The base plates 250 may extend parallel to each other and each of the base plates 250 may have corresponding instances of pivot orifices through which a respective axle 254 passes to define pivot points about which the anti-rebound bar 220 rotates, and orifices (e.g., first orifice 262, second orifice 264, third orifice 266 and fourth orifice 268) that define corresponding predefined positions at which the anti-rebound bar 220 may be retained. However, unlike the example of FIGS. 1-11, the orifices are disposed rearward of the location of the axle 254 instead of forward. This results because the axle 254 also passes through the anti-rebound bar 220 at a location that is farther from the proximal ends of the anti-rebound bar 220 than retaining orifice 274, which is opposite to the corresponding arrangement of the analogous components in the example of FIGS. 1-11.

Of note, the retaining pin 270 is also different than the retaining pin 170 of the example of FIGS. 1-11. In this regard, the retaining pin 170 of FIGS. 1-11 passes through the anti-rebound bar 120 and then through the base plate 150 moving in an inward direction (i.e., toward the longitudinal centerline of the child safety seat 100). However, the retaining pin 270 of the example of FIGS. 12 and 13 passes through the anti-rebound bar 220 and then through the base plate 250 moving in an outward direction (i.e., away from the longitudinal centerline of the child safety seat 100). As such, a width of the anti-rebound bar 120 of the example of FIGS. 1-11 is larger than a distance between the base plate 150 and the corresponding base plate on the other side. In other words, the anti-rebound bar 120 rotates about a pivot axis and on the outer sides of the base plates. However, a width of the anti-rebound bar 220 of the example of FIGS. 11-12 is less than a distance between the base plates 250. In other words, the anti-rebound bar 220 rotates about a pivot axis and on the inner sides of the base plates 250.

The retaining pin 270 may be biased outwardly (e.g., with a spring or other biasing member disposed about the axle 254) to pull or push the retaining pin outwardly) so that the user must pull the retaining pin 270 inwardly to remove the retaining pin 270 from a corresponding orifice of the base plate 250. When both retaining pins 270 have been pulled inwardly to allow a change in the orientation of the anti-rebound bar 220, the through-hole 256 in the anti-rebound bar 220 may be aligned with a different one of the orifices (e.g., first orifice 262, second orifice 264, third orifice 266 or fourth orifice 268). When such alignment occurs, the retaining pin 270 may either be released by the user or otherwise may be urged through the corresponding one of the first orifice 262, second orifice 264, third orifice 266 and fourth orifice 268 that is aligned with the through-hole 256.

Figure 14:
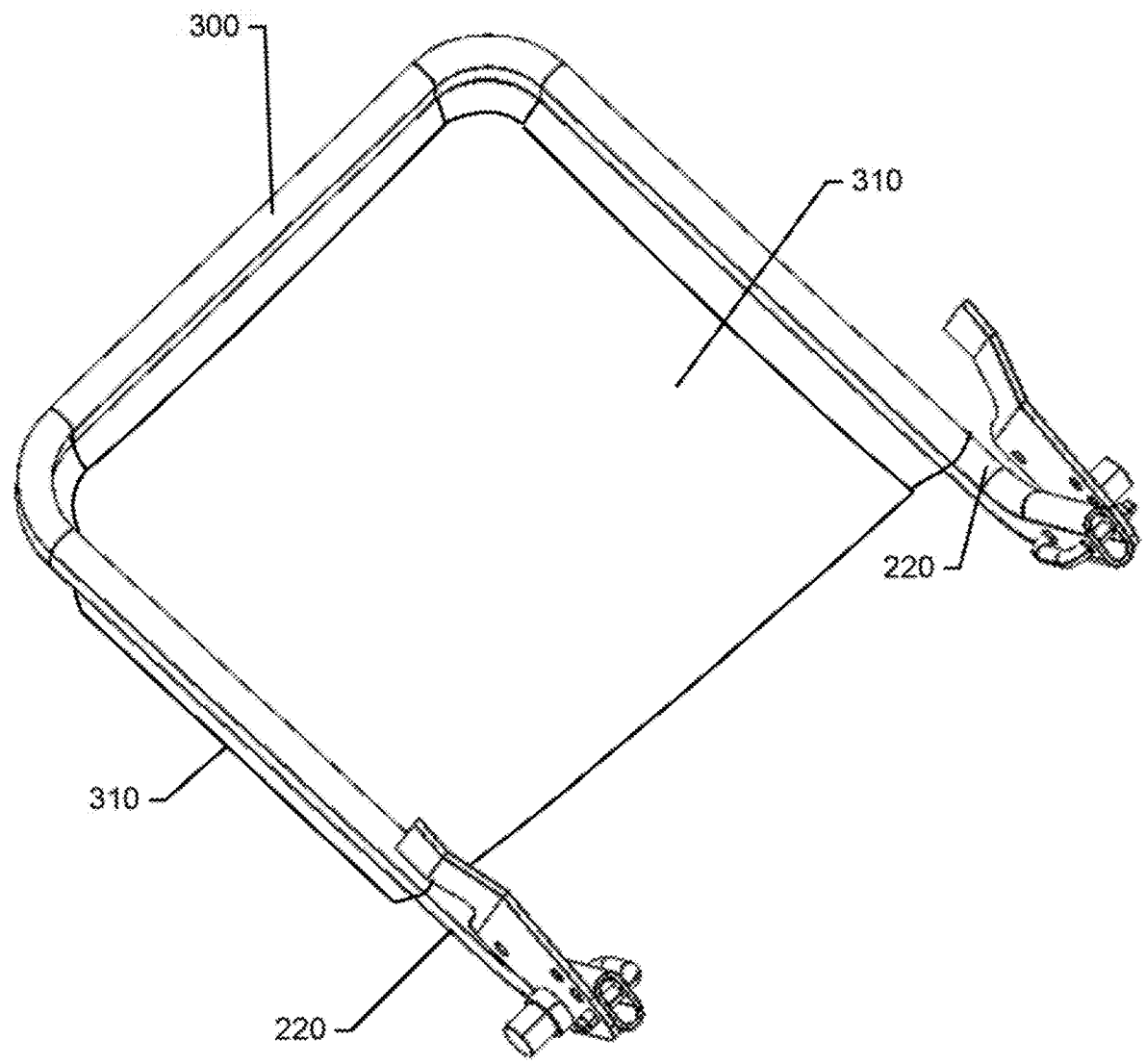
FIG. 14 illustrates fabric and padding provided on the anti-rebound bar in accordance with an example embodiment.

As discussed above, the padding and fabrics have generally been removed from the child safety seats 100 and 200 of the examples shown in FIGS. 1-13. Such padding may, of course, be added to the child safety seats 100 and 200. However, it should also be appreciate padding and fabrics could be added to the anti-rebound bars 120 and 220 as well. For example, FIG. 14 illustrates the addition of padding 300 and a fabric fill material 310 over the anti-rebound bar 220 to demonstrate one way that additional materials may be incorporated along with the anti-rebound bar of an example embodiment. The padding 300 and fabric fill material 310 may be employed together or separately to provide comfort for the occupant. However, the fabric fill material 310 may also prevent the passage of the occupant's foot between the vehicle seat 110 and the anti-rebound bar 220 (e.g., to avoid entrapment of the foot).

Thus, according to an example embodiment, a convertible child safety seat is provided. The convertible child safety seat may include a body configured to support an occupant, a base portion operably coupled to the body to support the body where the base portion is configured to be disposed on a vehicle seat base of a vehicle seat in either a forward facing configuration or a rearward facing configuration, and a multi-use anti-rebound bar. The anti-rebound bar may be operably coupled to the base portion or the body such that the anti-rebound bar is pivotable between at least a first position to provide a first function in the rearward facing configuration and a second position to provide a second function different than the first function in the forward facing configuration.

In some embodiments, the features described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the first function may be a safety related function, and the second function may be a non-safety related function. In some cases, the anti-rebound bar may extend downward through a plane in which a bottom of the base portion lies in the second position, and the anti-rebound bar may extend upward and way from the plane in which the bottom of the base portion lies in the first position. In an example embodiment, the anti-rebound bar may extend substantially parallel to and adjacent to a vehicle seat back of the vehicle seat in the first position. In some examples, the anti-rebound bar may be rotatable to a plurality of discrete positions corresponding to different recline positions of the body relative to the base portion in the first position. In some cases, the convertible child safety seat further includes a positioning assembly disposed on at least one side of a front portion of the body. The positioning assembly may include a base plate. A proximal end of the anti-rebound bar may be operably coupled to the base plate at a pivot axis. The base plate may include at least a first orifice and a second orifice equidistant from the pivot axis. The first orifice may correspond to the first position and the second orifice may correspond to the second position. In an example embodiment, the base plate may include one or more additional orifices corresponding to the first position. In some cases, the anti-rebound bar may include a retaining orifice. A retaining pin may be disposable through the retaining orifice and one of the first orifice or the second orifice responsive to alignment of the retaining orifice with the one of the first orifice or the second orifice to lock the anti-rebound bar in the first position or the second position, respectively. In an example embodiment, the retaining pin may be biased to pass through the retaining orifice and the first orifice or the second orifice. In some cases, the retaining pin may include a snap lock, wire lock, cotter pin, tab lock or a ball lock. In an example embodiment, the retaining pin may be connected (e.g., tethered or permanently attached to) to the convertible child safety seat when the retaining pin is removed from the first orifice and the second orifice. In an example embodiment, the retaining pin may be configured to pass inwardly through the anti-rebound bar and then the first orifice or the second orifice. In some cases, the retaining pin may be configured to pass outwardly through the anti-rebound bar and then the first orifice or the second orifice. In an example embodiment, the positioning assembly may be accompanied by a second positioning assembly disposed on an opposite side of the front portion of the body with respect to the side on which the positioning assembly is disposed.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A convertible child safety seat comprising:
    a body configured to support an occupant;
    a base portion operably coupled to the body to support the body, the base portion being configured to be disposed on a vehicle seat base of a vehicle seat in either a forward facing configuration or a rearward facing configuration; and
    a multi-use anti-rebound bar, the anti-rebound bar being operably coupled to the base portion or the body such that the anti-rebound bar is pivotable between at least a first position to provide a first function in the rearward facing configuration and a second position to provide a second function different than the first function in the forward facing configuration;
    wherein the anti-rebound bar extends downward through a plane in which a bottom of the base portion lies in the second position, and the anti-rebound bar extends upward and away from the plane in which the bottom of the base portion lies in the first position, and
    wherein, in the rearward configuration, the anti-rebound bar is rotatable such that it is configured to be maintained in a plurality of discrete positions other than the first and second positions, each one of the plurality of discrete positions of the anti-rebound bar corresponding to a different recline position of the body relative to the base portion with the base portion in the rearward facing configuration.

2. The convertible child safety seat of claim 1, wherein the first function comprises the anti-rebound bar being in contact with a vehicle seat back, and the second function comprises the anti-rebound bar not being in contact with the vehicle seat back.

3. The convertible child safety seat of claim 1, wherein the anti-rebound bar extends substantially parallel to and adjacent to a vehicle seat back of the vehicle seat in the first position when the base portion is disposed on the vehicle seat base.

4. The convertible child safety seat of claim 3, wherein the body is in a non-reclined position when the anti-rebound bar is in the first position, and wherein, in the rearward facing configuration, a respective recline position includes a back portion of the body being at a smaller angle relative to the base portion than when the child safety seat is in the non-reclined position.

5. The convertible child safety seat of claim 1, further comprising a positioning assembly disposed on at least one side of a front portion of the body.

6. The convertible child safety seat of claim 5, wherein the positioning assembly comprises a base plate, wherein a proximal end of the anti-rebound bar is operably coupled to the base plate at a pivot axis, wherein the base plate includes at least a first orifice and a second orifice equidistant from the pivot axis, and wherein the first orifice corresponds to the first position and the second orifice corresponds to the second position.

7. The convertible child safety seat of claim 6, wherein the base plate includes one or more additional orifices corresponding to the first position.

8. The convertible child safety seat of claim 6, wherein the anti-rebound bar includes a retaining orifice, and wherein a retaining pin is disposable through the retaining orifice and one of the first orifice or the second orifice responsive to alignment of the retaining orifice with the one of the first orifice or the second orifice to lock the anti-rebound bar in the first position or the second position, respectively.

9. The convertible child safety seat of claim 8, wherein the retaining pin is biased to pass through the retaining orifice and the first orifice or the second orifice.

10. The convertible child safety seat of claim 8, wherein the retaining pin comprises a snap lock, wire lock, cotter pin, tab lock or a ball lock.

11. The convertible child safety seat of claim 8, wherein the retaining pin is connected to the convertible child safety seat when the retaining pin is removed from the first orifice and the second orifice.

12. The convertible child safety seat of claim 8, wherein the retaining pin passes inwardly through the anti-rebound bar and then the first orifice or the second orifice.

13. The convertible child safety seat of claim 8, wherein the retaining pin passes outwardly through the anti-rebound bar and then the first orifice or the second orifice.

14. The convertible child safety seat of claim 5, further comprising a second positioning assembly disposed on an opposite side of the front portion of the body with respect to the side on which the positioning assembly is disposed.

15. A convertible child safety seat comprising:
a body configured to support an occupant;
a base portion operably coupled to the body to support the body, the base portion being configured to be disposed on a vehicle seat base of a vehicle seat in either a forward facing configuration or a rearward facing configuration, and the body being configured to pivot relative to the base portion such that an angle between a back portion of the body and the base portion is different between a non-reclined position and a reclined position of the body;
a multi-use anti-rebound bar, the anti-rebound bar being operably coupled to the base portion or the body such that the anti-rebound bar is pivotable between at least a first position and a third position to provide a first function in the rearward facing configuration and between a second position to provide a second function different than the first function in the forward facing configuration; and
a positioning assembly configured to enable the anti-rebound bar to pivot between, and be maintained in, the first position, the second position, and the third position, the positioning assembly being disposed on at least one side of a front portion of the body, wherein the positioning assembly comprises a base plate, wherein a proximal end of the anti-rebound bar is operably coupled to the base plate at a pivot axis, wherein the base plate includes at least a first orifice, a second orifice, and a third orifice equidistant from the pivot axis, and wherein the first orifice corresponds to the first position, the second orifice corresponds to the second position, and the third orifice corresponds to the third position,
wherein the first and third orifices are positioned on the base plate such that, when the base portion is disposed on the vehicle seat base in the rearward configuration, the anti-rebound bar in the first position extends substantially parallel and adjacent to a vehicle seat back of the vehicle seat with the body in the non-reclined position and the anti-rebound bar in the third position extends substantially parallel and adjacent to the vehicle seat back of the vehicle seat with the body in the reclined position.

16. The convertible child safety seat of claim 15, wherein the anti-rebound bar extends downward through a plane in which a bottom of the base portion lies in the second position, and the anti-rebound bar extends upward and away from the plane in which the bottom of the base portion lies in the first position.

17. The convertible child safety seat of claim 15, wherein the base plate comprises one or more additional orifices corresponding to one or more additional positions of the anti-rebound bar.

18. The convertible child safety seat of claim 15, wherein the anti-rebound bar includes a retaining orifice, and wherein a retaining pin is disposable through the retaining orifice and one of the first orifice or the second orifice responsive to alignment of the retaining orifice with the one of the first orifice or the second orifice to lock the anti-rebound bar in the first position or the second position, respectively.

19. The convertible child safety seat of claim 18, wherein the retaining pin is biased to pass through the retaining orifice and the first orifice or the second orifice.

20. The convertible child safety seat of claim 18, wherein the retaining pin comprises a snap lock, wire lock, cotter pin, tab lock, or ball lick.

* * * * *